Patented Aug. 4, 1936

2,049,974

UNITED STATES PATENT OFFICE 2,049,974

RESILIENT ARTICLE AND PROCESS OF MAKING THE SAME

Joseph C. Patrick, Trenton, N. J.

No Drawing. Application October 29, 1931, Serial No. 571,869

23 Claims. (Cl. 18—59)

This invention relates to materials which are suitable for making articles that are useful for many different purposes. One component of the materials is rubber and another component is an olefin-polysulfide reaction product. These components are separately formed in suitable shapes and are then caused to adhere to each other so tenaciously that the danger of separation of the two is practically eliminated.

The reaction product is a plastic that may be derived from the interaction of halogen additive compounds of olefins with soluble polysulfides, as described, for example, in my Patent No. 1,890,191. It has considerable tensile strength, high elasticity, is of high dielectric value, impermeable to water and gases, and is not affected by many solvents. It is not injured by boiling with dilute acid or alkalis. It resembles rubber in some of its physical and chemical properties, but is not injured by materials, such as oil, that injure rubber. This product may be conveniently defined as the highly sulfurized plastic product resulting from the interaction of polysulfides and organic compounds containing methylene or substituted methylene groups, one or more of which are linked to a negative radical or radicals. The plastic reaction products resulting from the interaction of polysulfides such as sodium or calcium polysulphides and methylene dihalide, ethylene dihalide, propylene dihalide, ethylene chlorhydrin, glyceryl thrichloride, dichloroethyl ether, dichloromethyl ether, formaldehyde, furfuraldehyde, and trimethylene halides, may be mentioned as some examples of the product.

By the present invention articles or products are formed of desirable shapes and sizes of rubber and the above mentioned reaction product which are made to adhere firmly to each other so that the articles or products have the flexibility and resiliency of rubber and at the same time the portions of the surfaces of these articles or products which are most likely to be injured by substances which would injure rubber, are coated with, or composed of, the reaction product firmly secured to the rubber. The invention is applicable to a variety of articles and in fact may be used wherever it is desirable to protect rubber articles from the injurious effect of oil or other substances. One of the common uses of the invention is to make rings for valves and gaskets for joints where oil is present.

In carrying out the invention raw rubber containing an accelerator, a vulcanizing agent such as sulphur, and a filler or fillers is formed into the desired shape and the above mentioned reaction product, which may also contain fillers and the like, is formed into appropriate shapes, the rubber and the reaction product are caused to contact with each other and heat is applied to vulcanize the rubber and cure the reaction product. Pressure may also be applied during the heating operation. After the rubber has been vulcanized and the reaction product cured in contact with each other they are found to be firmly adherent to each other to make up a firmly united structure. The rubber portion of the desired article and the reaction product portion thereof may be separately formed into the desired shapes and the two placed together to form the final article, or, sheets or other shapes of the rubber and the reaction product may be formed and caused to adhere to each other as described above, after which the articles or products of final form can be cut from the resulting bonded product.

It has been found that in order to cause the above mentioned reaction product to stick to a rubber compound it is desirable for the rubber compound to be substantially free from paraffin and stearic acid, as well as any compounding oils or softeners that tend to bloom to the surface of the rubber during storage or cure. It has also been found that when the rate of curing the rubber is too rapid the knitting or sticking of the reaction product thereto during the heating step is not as effective as when lower rates of cure are used. For this reason the accelerators used in the rubber should be of such an amount and character as to cause the rubber to become vulcanized within approximately the same time that the reaction product becomes cured. This will usually be the equivalent of about 50 minutes at 287° F., though the time may be varied considerably and will depend to some extent upon the particular rubber compound and the reaction product that are being united. Higher curing temperatures require less time and vice-versa.

The above mentioned reaction product itself should also be substantially free from paraffin and stearic acid. Tests thus far made indicate that the smaller the amounts of paraffin and stearic acid are the better the results are.

A small amount of pigment both in the rubber and in the reaction product has been found to give more satisfactory results than larger amounts of pigment. For example, a reaction product of the sort described containing not more than about 10 parts by weight of zinc oxide and 25 parts by weight of carbon black to 100 parts of the reaction product has been found to unite firmly to rubber compounds free from paraffin and stearic acid and containing not more than about 15% by volume of loading compounds, such as carbon black and zinc oxide. However, when a smaller amount of loading compounds is used in the reaction product larger amounts can be used in the rubber, and vice-versa and the two can still be made to adhere tenaciously.

It has also been found that rubber can be mixed with the reaction products before the reaction product is united to rubber. When the reaction product has between 5% and 20% of rubber by weight mixed with it its adherence to the rubber component of the article seems to be enhanced. However, when too much rubber is mixed with the reaction product the protection of the surface of the final product from the deteriorating effect of oil and the like is in danger.

Pieces or surfaces of the reaction product can be stuck to other pieces or surfaces of the reaction product by following substantially the same procedure as described above, namely by keeping the pigment loading as low as can be done while still preserving the desired characteristics of the reaction product, with or without mixing up to about 20% of rubber with the reaction product. Likewise paraffin and stearic acid should not be present in appreciable amounts, or not above 0.5% by weight.

The following is given as a specific example of attaching the reaction product to rubber, but it is understood that the reaction product and the rubber compound can be varied considerably and that shapes other than sheets which have plain surfaces can be attached to each other along these surfaces.

A sheet is made up of the reaction product containing about 16% by volume of pigments, such as carbon black or zinc oxide depending upon the characteristics desired, and a small amount of rubber may be added. Preferably no paraffin or stearic acid is used, although amounts not more than about 0.5% by weight of each is permissible.

A sheet of raw rubber is made up containing not more than about 15% by volume of loading compounds, such as carbon black or zinc oxide, and a sufficient amount of sulphur and an accelerator to cause the rubber to become vulcanized in the equivalent of about 50 minutes at 287° F. Higher temperatures require less time, and vice-versa.

The reaction product sheet and the rubber sheet are pressed together and are placed in a vulcanizer and heated to a temperature of 287° F. until the rubber becomes vulcanized and the reaction product cured, which will usually take about 50 minutes. The reaction product and the rubber should have an opportunity to contact with each other while one or both is hot and therefore soft and tacky, and the surfaces that are to adhere should be kept as clean as possible.

After an article has been formed by causing the rubber and the reaction product to adhere to each other, the article may be bent repeatedly and cut without detaching the components from each other. When the reaction product is applied to the rubber it protects the same from oils and other chemicals which would attack the rubber if brought into direct contact therewith, and at the same time desired properties of the rubber, such as resilience and resistance to compression, are not lost.

I claim:

1. The process which comprises shaping separately a rubber compound and the reaction product of an alkaline polysulfide and an olefin compound containing the group $C_nH_{2n}$ combined with the equivalent of two monovalent negative radicals, applying them to each other, and heating them to vulcanize the rubber and cure said reaction product.

2. The process which comprises shaping separately a rubber compound and the reaction product of an alkaline polysulfide and an olefin compound containing the group $C_nH_{2n}$ combined with the equivalent of two monovalent negative radicals, applying them to each other, and heating them to a temperature of about 287° F. long enough to vulcanize the rubber and cure said reaction product.

3. The process which comprises shaping separately a rubber compound and the reaction product of an alkaline polysulfide and an olefin compound containing the group $C_nH_{2n}$ combined with the equivalent of two monovalent negative radicals, said reaction product containing rubber, applying them to each other, and heating them to vulcanize the rubber and cure said reaction product.

4. The process which comprises shaping separately a rubber compound and the reaction product of an alkaline polysulfide and an olefin compound containing the group $C_nH_{2n}$ combined with the equivalent of two monovalent negative radicals, said reaction product containing not more than 20% by weight of rubber, applying them to each other, and heating them to vulcanize the rubber and cure said reaction product.

5. The process which comprises shaping separately a rubber compound and the reaction product of an alkaline polysulfide and an olefin compound containing the group $C_nH_{2n}$ combined with the equivalent of two monovalent negative radicals, applying them to each other, and heating them to vulcanize the rubber and cure said reaction product, the rubber and said reaction product being substantially free from paraffin and stearic acid.

6. The process which comprises shaping separately a rubber compound and the reaction product of an alkaline polysulfide and an olefin compound containing the group $C_nH_{2n}$ combined with the equivalent of two monovalent negative radicals, said rubber compound and said reaction product each containing pigments, applying them to each other, and heating them to vulcanize the rubber and cure the said reaction product.

7. The process which comprises shaping separately a rubber compound and the reaction product of an alkaline polysulfide and an olefin compound containing the group $C_nH_{2n}$ combined with the equivalent of two monovalent negative radicals, said rubber compound and said reaction product each containing pigments of less than about 15% of itself by weight, applying them to each other, and heating them to vulcanize the rubber and cure said reaction product.

8. A product comprising vulcanized rubber in one portion and in another portion the cured reaction product of an alkaline polysulfide and an olefine compound containing the group $C_nH_{2n}$ combined with the equivalent of two monovalent negative radicals, each substantially free from paraffin and stearic acid, and firmly secured to each other.

9. A product comprising vulcanized rubber in one portion and in another portion the cured reaction product of an alkaline polysulfide and an olefine compound containing the group $C_nH_{2n}$ combined with the equivalent of two monovalent negative radicals, each substantially free from paraffin and stearic acid, said portions adhering to each other without other agencies.

10. The process which comprises shaping separately a rubber compound and the reaction product of an alkaline polysulfide and an olefin compound containing the group $C_nH_{2n}$ combined with the equivalent of two monovalent negative radicals, applying them to each other, and heating them to vulcanize the rubber and cure said reaction product, said product containing pigments.

11. The process which comprises shaping separately a rubber compound and the reaction product of an alkaline polysulfide and an olefin compound containing the group $C_nH_{2n}$ combined with the equivalent of two monovalent negative radicals, applying them to each other, heating them to vulcanize the rubber and cure said reaction product, said product containing pigments, and said reaction product also containing pigments.

12. The process which comprises applying the reaction product of an alkaline polysulfide and an olefin compound containing the group $C_nH_{2n}$ combined with the equivalent of two monovalent negative radicals to a rubber surface, and heating to vulcanize the rubber and cure said reaction product.

13. A product comprising a rubber article and a coating of the reaction product of an alkaline polysulfide and an olefin compound containing the group $C_nH_{2n}$ combined with the equivalent of two monovalent negative radicals on the surface thereof.

14. A product comprising a vulcanized rubber article and a coating of the reaction product of an alkaline polysulfide and an olefin compound containing the group $C_nH_{2n}$ combined with the equivalent of two monovalent negative radicals on the surface thereof.

15. A product comprising a vulcanized rubber article and a coating of the reaction product of an alkaline polysulfide and an olefin compound containing the group $C_nH_{2n}$ combined with the equivalent of two monovalent negative radicals on the surface thereof intimately adhering to each other independently of extraneous adhesives.

16. The process which comprises causing a flexible resilient substance that is acid and alkali resistant to adhere to the surface of rubber by applying heat to the rubber and said substance while they are in contact with each other, said substance being coextensible with the rubber so that the interface between the two materials continues to adhere when flexed or stretched.

17. A product comprising a rubber article and a coating of a flexible resilient substance that is acid and alkali resistant adhering thereto, said substance being coextensible with the rubber so that the interface between the two materials continues to adhere when the product is flexed or stretched.

18. A product comprising a rubber article and a coating of a flexible resilient substance, that is highly resistant to acids and liquids which affect rubber deleteriously, adhering to and protecting said rubber article.

19. An article of manufacture comprising a backing of resilient material such as rubber, having a surface thereof protected by a non-porous, non-corrosive plastic coating which is bonded thereto and which will not interfere with the resiliency of the backing, said coating having mechanical properties generally resembling those of soft vulcanized rubber and being substantially as resilient as the backing to prevent cracking or peeling of the coating from the backing when the latter is flexed, said coating being capable of vulcanization at substantially the same temperature as said backing and being insoluble in alcohol, benzine and various acids.

20. A product comprising vulcanized rubber in one portion, and in another portion the cured reaction product of an alkaline polysulfide and dichloro ether.

21. A product comprising vulcanized rubber in one portion and in another portion the cured reaction product of an alkaline polysulfide and dichloro ether, said portions adhering to each other without other agencies.

22. The process which comprises applying the reaction product of an alkaline polysulfide and dichloro ether to a rubber surface, and heating to vulcanize the rubber and cure the sulphur plastic.

23. A product comprising a vulcanized rubber article and a coating of the reaction product of an alkaline polysulfide and dichloroether on the surface thereof, intimately adhering to each other.

JOSEPH C. PATRICK.